United States Patent [19]
Worth

[11] Patent Number: 5,257,642
[45] Date of Patent: Nov. 2, 1993

[54] TIRE PRESSURE QUICK DISCONNECT VALVE

[76] Inventor: Tommy A. Worth, 8208 E. 58th, Tulsa, Okla. 74145

[21] Appl. No.: 800,609

[22] Filed: Nov. 27, 1991

[51] Int. Cl.$^5$ .............................................. B60C 29/06
[52] U.S. Cl. .................................. 137/230; 152/427; 403/324
[58] Field of Search .......... 152/427, 428, 429, DIG. 7, 152/DIG. 11; 137/230, 226, 231, 614, 224; 285/317; 403/324, 325; 251/149.6

[56] References Cited

U.S. PATENT DOCUMENTS

| | | | |
|---|---|---|---|
| 1,104,902 | 7/1914 | Jarvis | 137/230 |
| 1,179,668 | 4/1916 | Shewmaker | 137/230 |
| 1,869,051 | 7/1932 | Davis | 137/224 |
| 1,937,038 | 11/1933 | Ingram | 137/224 |
| 4,076,037 | 2/1978 | Perez | 137/230 |
| 4,151,863 | 5/1979 | Stevens et al. | 137/230 |
| 4,613,112 | 9/1986 | Phlipot et al. | 285/317 |
| 4,681,148 | 7/1987 | Decker, Jr. et al. | 137/230 |
| 4,869,306 | 9/1989 | Keys | 152/427 |
| 4,928,859 | 5/1990 | Krahn et al. | 285/317 |
| 5,033,777 | 7/1991 | Blenkush | 285/317 |
| 5,060,685 | 10/1991 | Zhabokrug | 137/230 |
| 5,181,977 | 1/1993 | Gneiding et al. | 137/224 |

FOREIGN PATENT DOCUMENTS 1361837 4/1964 France .................... 152/427

Primary Examiner—Michael W. Ball
Assistant Examiner—Nancy T. Krawczyk
Attorney, Agent, or Firm—Catalano, Zingerman & McKay

[57] ABSTRACT

A quick disconnect pressure relief valve for a tire mounted on a rim includes a manually operated on/off valve mountable on the rim to provide a discrete pneumatic path between the tire interior and the outer atmosphere. The on/off valve is normally closed. A normally closed pressure operated valve insertable into the on/off valve opens the on/off valve to the passage of air through the inserted pressure operated valve to the exterior atmosphere. A plurality of such pressure operated valves calibrated to release air at different preselected tire pressure levels may be interchanged in the on/off valve. A latch is provided for securing the selected pressure operated valve in the manually operated on/off valve. Thus, to rapidly change the tire pressure level, the user need only insert a pressure operated valve calibrated to the desired tire pressure into the manually operated on/off valve. In a preferred embodiment of the invention, each pressure operated valve includes an adjustable bias by which the user can preset its particular pressure level. By using a plurality of such pressure operated valves with the manually operated on/off valve, the user can preset any number of pressure operated valves to provide a wide range of preselected pressure levels for the tire.

12 Claims, 1 Drawing Sheet

TIRE PRESSURE QUICK DISCONNECT VALVE

BACKGROUND OF THE INVENTION

This invention relates generally to tires and more particularly concerns pressure control valves for tires.

One application of this invention is in the highly competitive world of auto racing. Since the difference between winning and losing is often measured in seconds, racing teams seek every competitive edge possible to minimize time in the pits. Tire performance and wear is dependent at least in part upon the tire pressure which should be varied as track conditions such as temperature, surface texture and precipitation vary.

Adjustments in tire pressure are presently accomplished by the use of an air bleeder which extends through the rim of the tire. The use of a bleeder requires increasing air pressure levels in the tire until air is audibly heard passing through the bleeder. The pressure in the tire is then checked with a gauge to determine the pressure at which the bleeder passes air. The process is continually repeated until the bleeder is adjusted to the proper pressure setting for the track conditions. This multiple repetition process is time consuming at best. In normal race conditions, track noise makes it more difficult, if not impossible, because the user cannot hear air passing through the bleeder.

It is, therefore, an object of the present invention to provide a tire pressure disconnect valve that permits rapid change of preset tire pressure levels. Similarly, it is an object of the present invention to provide a tire pressure disconnect valve that combines a permanent on/off valve with a plurality of removable pressure operated valves previously calibrated at a variety of preselected pressures. It is a further object of this invention to provide a tire pressure disconnect valve which permits the user to rapidly interchange pressure disconnect valves set at various preselected pressure levels. And it is an object of the present invention to provide a tire pressure disconnect valve capable of receiving one of a plurality of valves having pressure responsive inserts that may be variably calibrated by the user to a variety of preselected pressure levels.

SUMMARY OF THE INVENTION

In accordance with the invention, a quick disconnect pressure relief valve for a tire mounted on a rim includes a manually operated on/off valve mountable on the rim to provide a discrete pneumatic path between the tire interior and the outer atmosphere. The on/off valve is normally closed. A normally closed pressure operated valve insertable into the on/off valve opens the on/off valve to the passage of air through the inserted pressure operated valve to the exterior atmosphere. A plurality of such pressure operated valves calibrated to release air at different preselected tire pressure levels may be interchanged in the on/off valve. A latch is provided for securing the selected pressure operated valve in the manually operated on/off valve. Thus, to rapidly change the tire pressure level, the user need only insert a pressure operated valve calibrated to the desired tire pressure into the manually operated on/off valve. In a preferred embodiment of the invention, each pressure operated valve includes an adjustable bias by which the user can preset its particular pressure level. By using a plurality of such pressure operated valves with the manually operated on/off valve, the user can preset any number of pressure operated valves to provide a wide range of preselected pressure levels for the tire.

In a preferred embodiment of the invention, the on/off valve includes a spring biased poppet which normally blocks the passage of air through the valve. The pressure valve has a body with one end adapted to be inserted into the on/off valve to overcome the bias of the poppet to open the on/off valve to passage of air through a port in the body. A second pressure operated spring biased poppet disposed in the body port blocks that port against passage of air to the exterior atmosphere until the tire pressure exceeds the bias. A mechanism is provided for adjusting the bias of the second poppet to change the pressure level of the disconnect valve and, therefore, of the tire.

IN THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE INVENTION

Figure 1:
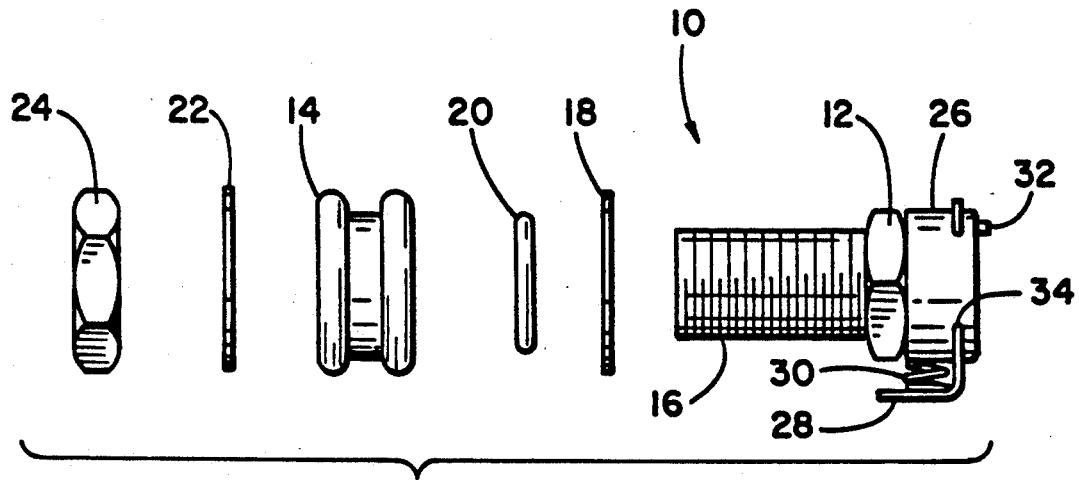
FIG. 1 is a side elevation view of a manually operated on/off valve.

FIG. 1 illustrates a typical poppet type on/off valve such as the Colder Products Valve No. PMD18-32 presently available for gating a variety of fluids and gases. These valves are frequently used, for example, in conjunction with hospital intravenous units. The on/off valve 10 has a body portion 12 with a port (not shown) extending through the body 12 to provide a discrete pneumatic path from one end of the body 12 to the other. A grommet 14 slides onto a threaded portion 16 of the body 12 between a first washer 18 and an O-ring 20 and a second washer 22 and a nut 24 which tightens onto the threaded portion 16 of the body 12 to secure the grommet 14 in place on the body 12. The body 12 also includes an adapter 26 which houses a locking mechanism consisting of a latch 28 biased by a spring 30 and guided by a spring biased pin 32. The latch has a hole 34 through it to permit access to the port in the body 12.

Figure 2:
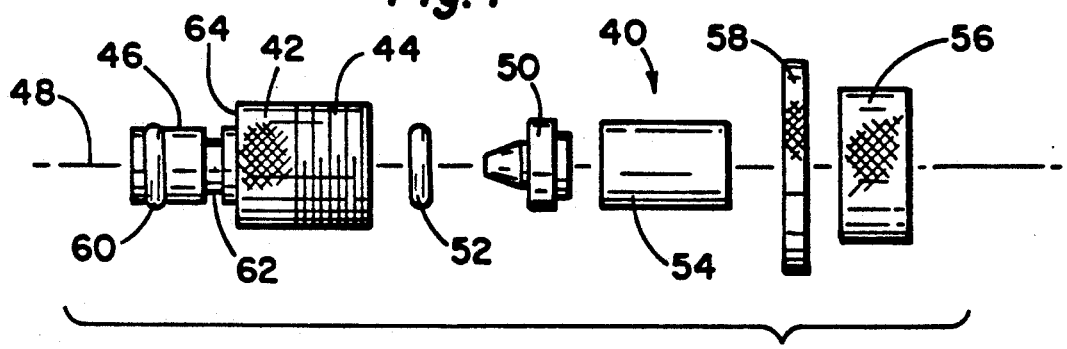
FIG. 2 is a side elevation view of a pressure operated valve having an adjustable bias mechanism for varying the valve operating pressure.

Turning to FIG. 2, a pressure operated valve 40 for use in conjunction with the on/off valve 10 is illustrated. The pressure operated valve 40 has a body 42 with an exteriorly threaded portion 44 and a neck portion 46. A port or annular passage extends through the body 42 along its longitudinal axis 48 to provide a discreet pneumatic path from one end of the body 42 to the other. The interior of the body 42 has a seat for receiving a poppet 50 with a quad ring 52 around the poppet 50 to provide a pneumatic seal when the poppet 50 is fully seated in the body 42. A spring 54 seated in the body 42 on the poppet 50 is compressed by a screw-on cap 56 which threads on to the threaded portion 44 of the body 42. Thus, the bias of the spring 54 against the poppet 50 can be adjusted by the tightening or releasing of the threaded cap 56 on the body 42. A jam nut 58 may be threaded onto the body 42 prior to the cap 56 to secure the cap at the desired bias position on the body 42. The cap 56 has a port through it defining a pneumatic path from the interior of the body 42 to the outer atmosphere. The neck portion 46 of the body 42 of the pressure operated valve 40 is adapted for insertion into the port in the body portion 12 of the on/off valve 10 through the adapter 26. The neck portion 46 is fitted with an O-ring 60 to provide a pneumatic seal between the outer surface of the neck portion 42 and the inner surface of the adapter 26. The neck portion 46 is also provided with a circumferential groove 62 cooperable with the latch 28 of the on/off valve 10 to removably secure the pressure operated valve 40 in position in the on/off valve 10. That is, as the neck portion 46 of the body 42 of the pressure operated valve 40 is inserted into the adapter 26 of the on/off valve 10, the leading face 64 of the threaded portion 44 of the pressure operated valve 40 depresses the spring biased pin 32, releasing the latch 28 to the bias of its spring 30 to engage the latch 28 with the groove 62 in the pressure operated valve 40.

To remove the pressure operated valve 40 from the on/off valve 10, the latch 28 is manually pressed to overcome the bias of the spring 30, disengaging the latch 28 from the groove 62 and permitting the pressure operated valve 40 to be withdrawn from the on/off valve 10.

Figure 3:
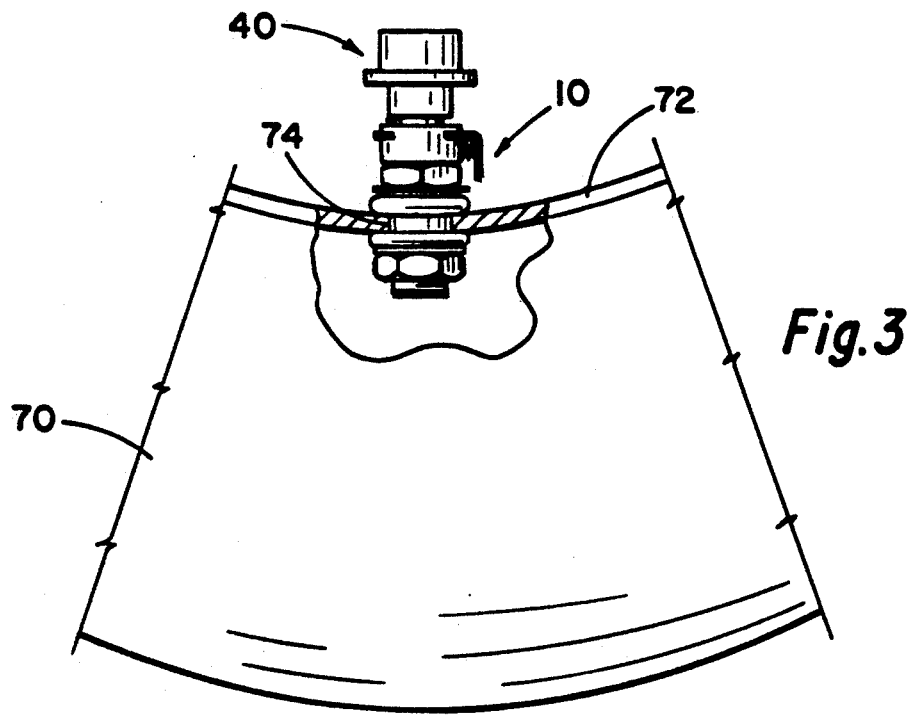
FIG. 3 is a side elevation view with parts broken away of the on/off valve and the pressure operated valve of FIGS. 1 and 2 in a mounted condition on a tire rim.

Turning now to FIG. 3, the assembly and operation of the quick disconnect valve can be explained. The tire 70 is to be mounted on a rim 72 having a hole 74 through it. The flexibly resilient grommet 14 is seated in the hole 74. The body portion 12 of the on/off valve is inserted into the grommet 14 with the first washer 18 and the O-ring in place. The second washer 22 is then slid over the body 12 and the nut 24 tightened to secure the on/off valve 10 in place on the rim 72. With the on/off valve 10 in place, the tire 70 can be mounted on the rim 72.

For any given set of conditions, a number of pressure operated valves 40 are preset at various operative pressure levels. Air pressure is applied through the neck 46 of the pressure operated valve 40 and the pressure at which the valve 40 passes air to the atmosphere is determined. The cap 56 is adjusted and the process repeated until the valve 40 is set at the desired operating pressure. This process is repeated for each of a plurality of valves 40 which are preset for a variety of preselected operative pressures. Thus prepared, the user can freely select a valve 40 which has been preset at a desired operating pressure for insertion into the on/off valve 10 under race track conditions without concern or need for valve adjustment in the pits. As race conditions change, the user need merely depress the latch 28, withdraw the pressure operated valve 40 in use from the on/off valve 10 and insert the newly selected pressure operated valve 40 in order to change the tire pressure.

While the device has been disclosed in relation to a race track application, other uses of the disconnect valve are contemplated. For example, head room levels of vehicles can readily be varied by changing the inflated level of the tires supporting the vehicle. This can be quickly and accurately accomplished by the use of pressure valves having their operating level pre-coordinated with the desired headroom of the vehicle.

Thus, it is apparent that there has been provided, in accordance with the invention, a tire pressure quick disconnect valve that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A quick disconnect pressure relief valve for a tire mounted on a rim comprising:
    means mountable on a rim having a port therethrough for providing a discrete path of pneumatic communication between the interior of a tire mounted on the rim and the atmosphere exterior thereto;
    means mounted on said communication means for blocking said port against passage of air to the exterior atmosphere;
    means having a port therethrough insertable into said communication means port and cooperable with said blocking means for opening said communication means port to passage of air through said insertable means port to the exterior atmosphere;
    means mounted on said insertable means for blocking said insertable means port against passage of air to the exterior atmosphere;
    means mounted on said insertable means biasing said insertable means blocking means against pressure in the tire for automatically opening said insertable means port to passage of air through said insertable means port to the exterior atmosphere while the pressure in the tire exceeds a predetermined bias pressure; and
    means mounted on said communication means spring biased for reciprocal slidable motion transverse to the path of insertion for rapidly securing and releasing said insertable means to and from said communication means.

2. A valve according to claim 1 further comprising means mounted on said insertable means for selectively varying the force exerted by said biasing means.

3. A valve according to claim 1 further comprising means disposed on said insertable means for providing a pneumatic seal between said insertable means and said communication means.

4. A quick disconnect pressure relief valve for a tire mounted on a rim comprising:
    a normally closed manually operated on/off valve mountable on a rim for providing a discrete path of pneumatic communication between the interior of a tire mounted on the rim and the atmosphere exterior thereto;
    a normally closed pressure operated valve insertable into said on/off valve for opening said on/off valve to passage of air through said pressure operated valve to the exterior atmosphere when the air pressure of the tire exceeds the pressure level of the pressure operated valve; and
    a latch mounted on said on/off valve spring biased for reciprocal slidable motion transverse to the path of insertion for rapidly securing and releasing said pressure operated valve to and from said on/off valve.

5. A valve according to claim 4 further comprising means mounted on said pressure operated valve for manually adjusting the pressure level of said pressure operated valve.

6. A valve according to claim 4 having a plurality of normally closed pressure operated valves each insertable into said on/off valve for opening said on/off valve to passage of air through said inserted pressure operated valve to the exterior atmosphere when the air pressure of the tire exceeds the pressure level of the inserted pressure operated valve.

7. A valve according to claim 6, each of said plurality of pressure operated valves having a different preset pressure level.

8. A valve according to claim 6, each of said plurality of pressure operated valves having means mounted thereon for manually adjusting the pressure level of its respective pressure operated valve.

9. A quick disconnect pressure relief valve for a tire mounted on a rim comprising:

an on/off valve adapted to be mounted through a rim having a port therethrough for providing a discrete path of pneumatic communication between the interior of a tire mounted on the rim and the atmosphere exterior thereto and a first spring biased poppet disposed therein normally blocking said port;

a body having one end adapted for insertion into said on/off valve port against the bias of said first poppet for opening said on/off valve port to passage of air through a port in said body to the exterior atmosphere;

a second spring biased poppet disposed in said body port for blocking said body port against passage of air to the exterior atmosphere;

means mounted on said insertable means biasing said insertable means blocking means against pressure in the tire for automatically opening said insertable means port to passage of air through said insertable means port to the exterior atmosphere while the pressure in the tire exceeds a predetermined bias pressure; and means mounted on said on/off valve biased for reciprocal slidable motion transverse to the path of insertion for rapidly securing and releasing said body to and from said on/off valve.

10. A quick disconnect pressure relief valve for a tire mounted on a rim comprising:

means mounted on a rim having a port therethrough for providing a discrete path of pneumatic communication between the interior of a tire mounted on the rim and the atmosphere exterior thereto;

means mounted on said communication means for blocking said port against passage of air to the exterior atmosphere;

means having a port therethrough slidably insertable into and removable from said communication means port and cooperable with said blocking means for respectively opening and closing said communication means port to passage of air through said insertable means port to the exterior atmosphere;

means mounted on said insertable means for blocking said insertable means port against passage of air to the exterior atmosphere;

means mounted on said insertable means biasing said insertable means blocking means against pressure in the tire for automatically opening said insertable means port to passage of air through said insertable means port to the exterior atmosphere while the pressure in the tire exceeds a predetermined bias pressure; and means mounted on said communication means spring biased for reciprocal slidable motion transverse to the path of insertion for rapidly securing and releasing said insertable means to and from said communication means.

11. A valve according to claim 10 further comprising means mounted on said insertable means for selectively varying the force exerted by said biasing means.

12. A valve according to claim 10 further comprising means disposed on said insertable means for providing a pneumatic seal between said insertable means and said communication means.

* * * * *